United States Patent [19]

Munroe

[11] Patent Number: 4,669,804
[45] Date of Patent: Jun. 2, 1987

[54] WALL-MOUNTABLE WIRING INSTALLATION

[75] Inventor: Ronald G. Munroe, Staten Island, N.Y.

[73] Assignee: Eagle Electric Mfg. Co., Inc., Long Island City, N.Y.

[21] Appl. No.: 744,786

[22] Filed: Jun. 14, 1985

[51] Int. Cl.⁴ .................. H01R 33/72; H01R 13/70
[52] U.S. Cl. .................. 439/398; 439/535; 439/565; 439/652; 439/599
[58] Field of Search .................. 339/20, 21 R, 175 C, 339/191 R, 191 A, 191 M, 192 R, 91 R, 175 R, 147 R, 147 P

[56] References Cited

U.S. PATENT DOCUMENTS

| | | | |
|---|---|---|---|
| 1,160,187 | 11/1915 | Meschenmoser | 339/191 R |
| 1,621,364 | 3/1927 | Goodridge | 339/191 R |
| 2,531,350 | 11/1950 | Chrastina | 200/51 R |
| 3,790,923 | 2/1974 | Mathe | 339/128 |
| 3,941,447 | 3/1976 | Hargrave et al. | 339/91 R |
| 3,957,336 | 5/1976 | Bromberg | 339/156 R |
| 4,046,449 | 9/1977 | Ranzanigo | 339/91 R |
| 4,180,303 | 12/1979 | Damsky | 339/156 R |
| 4,210,382 | 7/1980 | Culbertson | 339/192 R |

*Primary Examiner*—Gil Weidenfeld
*Assistant Examiner*—Gary F. Paumen
*Attorney, Agent, or Firm*—Kirschstein, Kirschstein, Ottinger & Israel

[57] ABSTRACT

A boxless wiring installation in which a wall switch or a duplex electrical receptacle may be mounted with snap action within and on a support member which is mounted by means of swing-out wall clamps to a wall.

17 Claims, 8 Drawing Figures

WALL-MOUNTABLE WIRING INSTALLATION

BACKGROUND OF THE INVENTION

1. Field of the Invention

This invention generally relates to a wall-mountable wiring installation and, more particularly, to a so-called boxless wiring device of the type particularly suitable for installation on and within a wall of a building such as a home, a mobile home or a factory-manufactured prefabricated home.

2. Description of the Prior Art

It is well known to install an electrical junction metallic box within an opening in a wall or the like, and thereupon to mount an electrical device, such as a duplex receptacle or a wall switch, on the box. The conventional duplex receptacle comprises a plastic body member having a pair of plug-receiving outlets arranged adjacent each other, each outlet being adapted to mate with either a 120 v or 220 v electrical plug having either two or three blades. The conventional receptacle has screw terminals on either side thereof to receive the bared ends of individual conductors of an electrical cable routed to the junction box. The conventional receptacle also has mounting ears at either end thereof and to which assembly screws are used to mount the receptacle to the junction box. A separate face plate having openings through which the electrical outlets extend is thereafter fastened with one or more screws to the receptacle or switch, not only for esthetic, but also for safety, purposes.

Although generally satisfactory for its intended purpose, the aforementioned wiring installation has not proven to be altogether satisfactory in terms of the lengthy time, large expense and inconvenience associated with, among other things, properly orienting the junction box, both vertically and horizontally, within the wall; assembling the junction box, receptacle and face plate as a unitary structure; properly preparing the electrical cable by severing the cable and routing the same to the box; and stripping the cable insulation and connecting the exposed conductors of the cable to an associated screw terminal on the receptacle or switch.

In an attempt to avoid the drawbacks associated with using a junction box, the prior art has also proposed so-called "boxless" wiring installations in which no metallic junction box is used. Such boxless installations are disclosed, for example, in U.S. Pat. Nos. 3,951,489; 3,951,502; 3,957,336 and 3,966,152, in which an electrical structure comprised of a duplex electrical receptacle is integrally formed with a face plate. A cover is mounted at the rear of the receptacle and bounds a single interior compartment to which an electrical cable is routed. Electrical contacts within the compartment engage the conductors in the cable and also engage the prongs of a plug inserted into the outlets of the receptacle. The receptacle with the cover mounted thereon is then clamped to the wall by turning wall-clamping screws and drawing swing-out wall clamps into clamping engagement with the rear face of the wall. The wall-mounting screws extend through the integral face plate, thereby exposing their heads and contributing to a non-finished, unesthetic appearance. The prior art also has proposed boxless structures in which the face plate is separate from the receptacle, with the face plate being separately mounted by means of screws to, or snapping onto, the receptacle.

Although the known boxless wiring installations do eliminate the need for the conventional junction box, and do reduce the high labor content involved in installing, cutting, stripping and wiring the individual conductors of an electrical cable, they still possess certain drawbacks. For example, one serious drawback is that, should a duplex receptacle or wall switch fail in the field, it cannot be readily replaced because special tools are required to clamp the cover to make the insulation displacing terminations on the receptacle. An electrician is usually called since the interior compartment of the wiring structure contains electrically-alive wires. The normal procedure is to replace a failed boxless installation with a conventional junction box and the appropriate electrical device.

Another serious drawback is that the installer of the known boxless wiring installations must remove all of the outer insulation of the cable, as well as all of the paper filler in the case of romex cable. This is very time consuming, but necessary because the interior electrical contacts located within the interior compartment of the duplex receptacle are in the immediate vicinity of the paper filler and, when an electrical plug is removed under load, the possibility of arcing between the interior electrical contacts can cause the paper filler to ignite, thereby representing a serious safety hazard.

Another problem associated with prior boxless wiring installations is that plastic barriers must be cut away or broken off from the walls bounding the interior compartment in order to allow for a through cable, or more than one cable, to be inserted therein. There are several possible variations in the number of cables to be routed to and terminated in the compartment. There could be one cable in, one cable in and one cable out, two cables in and one cable out, or two cables in and two cables out. Since all unused cable openings must be covered, and since there is a minimum of one cable and a maximum of four cables to be wired, the prior art boxless installations provided one constantly-open cable opening, and the remaining three cable openings were covered by the aforementioned plastic barriers. The cutting away or breaking off of one or more barriers is not only time-consuming for the installer, but also is messy.

Yet another problem associated with prior art boxless installations relates to the swing-out clamps which are used to secure the installation onto the wall. The known swing-out clamps have a clamping surface area which, if too small, tends to crush into the wall, thereby reducing the security of the installation. Also, the known clamps can, and often do, hang up on obstructions located behind the wall, on the cable itself or on displaced sections of the wall, so that the clamps sometimes cannot freely swing out and be clamped against the rear face of the wall. This problem cannot be overcome when the known boxless installations are in position on the wall and, hence, it is necessary for the installer to remove the boxless installation, cut or move the obstruction away from the swing-out clamps and, in some cases, to repeat this back-and-forth repositioning of the boxless installation on the wall, alternated with removing or cutting away any obstructions. This back-and-forth repositioning is a very time-consuming task, and represents a significant expense in terms of assembly cost.

SUMMARY OF THE INVENTION

1. Objects of the Invention

It is a general object of this invention to rapidly and efficiently install a wiring installation on and within a wall without using a conventional junction box.

It is another object of this invention to enable a home owner to replace a defective electrical device such as an electrical duplex receptacle or a wall switch without the need for any special tools, nor the need to call in an electrician.

It is a further object of this invention to physically isolate the electrical contacts within an electrical device from a cable routed to the installation by locating the electrical contacts in one compartment and by locating the cable in another separate wiring chamber.

It is still another object of this invention to enable a home owner to replace a defective electrical device without being exposed to or touching any electrically-alive wires, and without turning the power off.

It is yet another object of this invention to eliminate the prior art requirement to strip the insulation and remove and clean up all the paper filling of a romex cable routed to the installation.

It is another object of this invention to provide a wiring installation of the boxless type which, after installation of the electrical device, has no assembly screw heads exposed and visible, thereby rendering an attractive finished appearance.

Still another object of this invention is to eliminate the time-consuming prior art requirement to cut away or break off plastic barriers to complete the installation.

Yet another object of this invention is to provide a very broad clamping surface area, and to locate the same centrally of the wiring installation for fixedly securing the same on and within a wall without crushing or otherwise doing damage to the wall.

A further object of this invention is to render the space behind the wall in the vicinity of the swing-out clamps readily visible and accessible to an installer to enable the installer to visually see whether the swing-out clamps have moved out into proper position and, if not, to be able to forcibly push out the clamps, all without removing any portion of the wiring installation which has already been installed on the wall.

Another object of this invention is to readily remove a cover which overlies the wiring chamber without requiring special tools to inspect the wiring connections in the event that troubleshooting of the installation should become necessary.

It is still another object of this invention to readily mount the cover in a guided manner over the wiring chamber to prevent cable misalignment.

It is yet another object of this invention to readily mount the cover in either one of two different orientations over the wiring chamber, regardless of the direction which a single cable may exit the device.

It is a still further object of this invention to readily position two or more wiring installations side by side without requiring a special gauge fixture to ensure proper spacing between separate face plates.

It is another object of this invention to provide an attractive wiring installation which is easy to use and to install, inexpensive to manufacture, durable in construction, and which significantly reduces labor costs.

2. Features of the Invention

In keeping with these objects, and others which will become apparent hereinafter, one feature of the invention resides, briefly stated, in a wall-mountable wiring installation which comprises an electrical device mountable on and within a support member. The electrical device may advantageously be any wall switch or electrical receptacle, preferably a duplex receptacle. The electrical device generally includes a housing of electrically-insulating material, the housing having a front wall to which access is available from the exterior of the housing, a rear wall spaced from the front wall and having openings extending through the rear wall, and side walls extending between the front and rear walls and bounding therewith an interior compartment. The electrical device also includes electrical device contacts of electrically-conducting material. The device contacts have interior contact portions located within the compartment, and exterior blade portions integral with and extending from the interior contact portions through the openings in the rear wall and past the rear wall.

The support member includes a support body of electrically-insulating material. The support body has a generally planar support wall having, as considered in an intended position of use, a forwardly-facing front surface, a rearwardly-facing rear surface, and apertures extending through the front and rear surfaces. The support body also has first body walls extending generally perpendicularly and forwardly of the front surface of the support wall, and terminating in an open end. The first body walls and the support wall bound a pocket in which the aforementioned electrical device is insertable to a mounted position in which the blade portions extend through the apertures of the support wall and past the same. The support body further has a face plate integral with the first body walls at the open end of the latter, and lying in a plane generally parallel to and spaced from the support wall. The support wall still further has second body walls extending generally perpendicularly and rearwardly of the rear surface of the support wall, and terminating in an open end. A cover is mountable over the open end of the second body walls, and bounds therewith a wiring chamber in which an electrical current-carrying cable is received.

The support member also includes electrical wire contacts of electrically-conducting material which are located within the wiring chamber. The wire contacts have blade-wiping portions electromechanically engageable with the blade portions in the mounted position, and wire-engaging portions integral with the blade wiping portions and electromechanically engageable with the cable received in the wiring chamber.

The wiring installation still further includes clamping means on the support member for fixedly mounting the same behind and on a wall having a forwardly-facing front face and a rearwardly-facing rear face. The clamping means includes at least one, and preferably a pair of, wall clamps, each having a clamping surface movable toward the face plate, and at least one, and preferably a pair of, drive elements, each operative to move a respective clamping surface into clamping engagement with the rear face of the wall when the face plate is in overlying engagement with the front face of the wall.

The wiring installation additionally comprises snap-action co-acting means on the housing and the support body for snappingly engaging and retaining the electrical device in the mounted position. Thus, the installation and replacement of the electrical device in the wall-mounted support member is easily, rapidly and safely effected without direct access to the current-carrying cable.

In accordance with the above features, a wiring installation may be rapidly and efficiently installed on and in a wall without using a conventional junction box. A home owner may replace a defective electrical device without the need for any special tools or the need to call an electrician. Since the electrical device contacts within the interior compartment of the housing of the electrical device are physically isolated from the cable located within the wiring chamber of the support body, a home owner may replace a defective electrical device without being exposed to or touching an electrically-alive wire and without turning off the power. The physical isolation between the interior compartment of the electrical device and the wiring chamber of the support body eliminates the prior art requirement to strip the insulation and remove all the paper filler of a romex cable routed to the installation and, thus, eliminates a potential safety hazard with regard to igniting the paper filler.

In accordance with another feature of this invention, each drive element has an elongated drive shaft extending along and turnable about an axis, and has a drive head located within the pocket. In addition, the drive head is located underneath and is concealed by the front wall of the electrical device in the mounted position of the latter. This feature creates an attractive finished appearance to the wiring installation, since no assembly screw heads are exposed or visible after the electrical device is in its mounted position.

Yet another feature of this invention resides in forming at least one, and preferably a pair of, cutouts in the first body walls of the support body, which cutouts are in open communication with the pocket. Additionally, each wall clamp has an arm portion on which the clamping surface is provided, the arm portion extending, at least in part, through a respective cutout into the pocket in an initial storage position. By accommodating at least a portion of each wall clamp within the pocket, this invention proposes a very broad clamping surface area for fixedly securing the wiring installation on the wall without doing damage to the wall. Also, each cutout for a portion of the clamping surface in the first body walls serves as a visible indication as to whether the clamp has rotated out behind the wall to its proper position. If the clamp is so obstructed, it can be forcibly pushed out into its proper position, thereby greatly improving the efficiency of the installation without requiring any back-and-forth repositioning of the support member on the wall.

Still another feature of this invention is embodied in bend-away tabs hingedly connected to the cover and to the second body walls. Each tab is yieldable in response to pressure to form an open channel between the wiring chamber and the exterior of the support member. The current-carrying cable or cables are inserted through each such opened channel, which greatly simplifies the wiring connection since the installer no longer has to cut away or break off any plastic barriers to complete the wiring installation.

This invention further proposes that the snap-action co-acting means includes a plurality of legs adjacent the side walls of the housing of the electrical device, each leg being resiliently yieldable toward a respectively adjacent side wall during the insertion of the housing into the pocket. Each leg has an engaging portion which is received with snap-type engagement into corresponding recesses formed on the first body walls in the mounted position. Each leg also has a tool-engaging free end extending beyond the face plate in the mounted position, each such free end being accessible to a demounting tool to readily enable a home owner to replace the electrical device.

In addition, means are provided on the cover and the support body for snappingly engaging the cover on the latter. The cover includes a generally planar base wall and a plurality of elongated legs, each extending generally perpendicularly to the base wall and being resiliently yieldable in a direction transverse to its elongation. The legs terminate in shoulders, and each shoulder is received with a snap-type engagement upon mounting of the cover into a plurality of respective recesses formed on the support body. These snap-action legs on the cover enable the same to be guidably mounted over the wiring chamber, and to be removed therefrom without requiring special tools to pry the cover therefrom. Troubleshooting of the wiring installation thus is considerably simplified.

The novel features which are considered as characteristic of the invention are set forth in particular in the appended claims. The invention itself, however, both as to its construction and its method of operation, together with additional objects and advantages thereof, best will be understood from the following description of the specific embodiments when read in connection with the accompanying drawings.

DETAILED DESCRIPTION OF THE PREFERRED EMBODIMENTS

Figure 7:
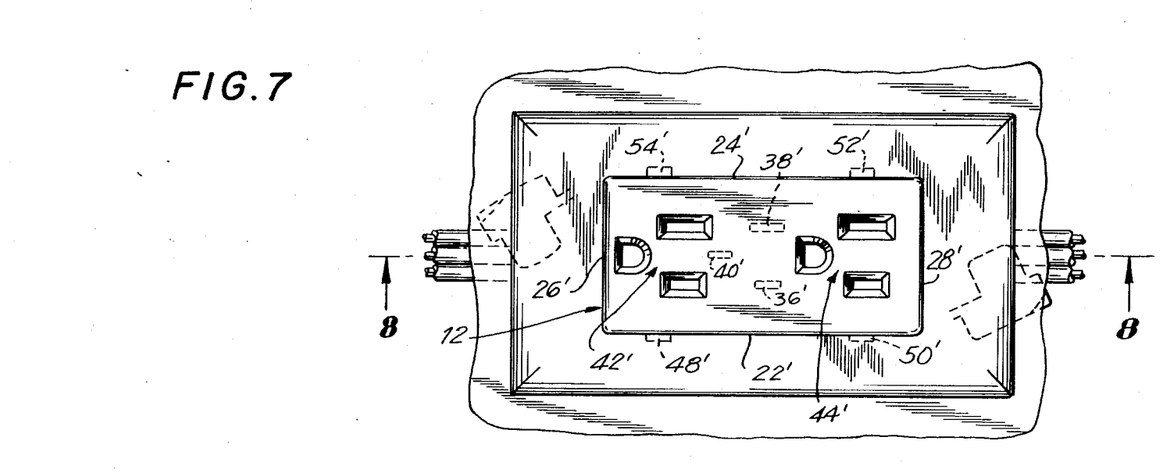
FIG. 7 is a view analogous to FIG. 2, but showing a duplex receptacle mounted in another embodiment of a wiring installation, in accordance with this invention.
Figure 8:
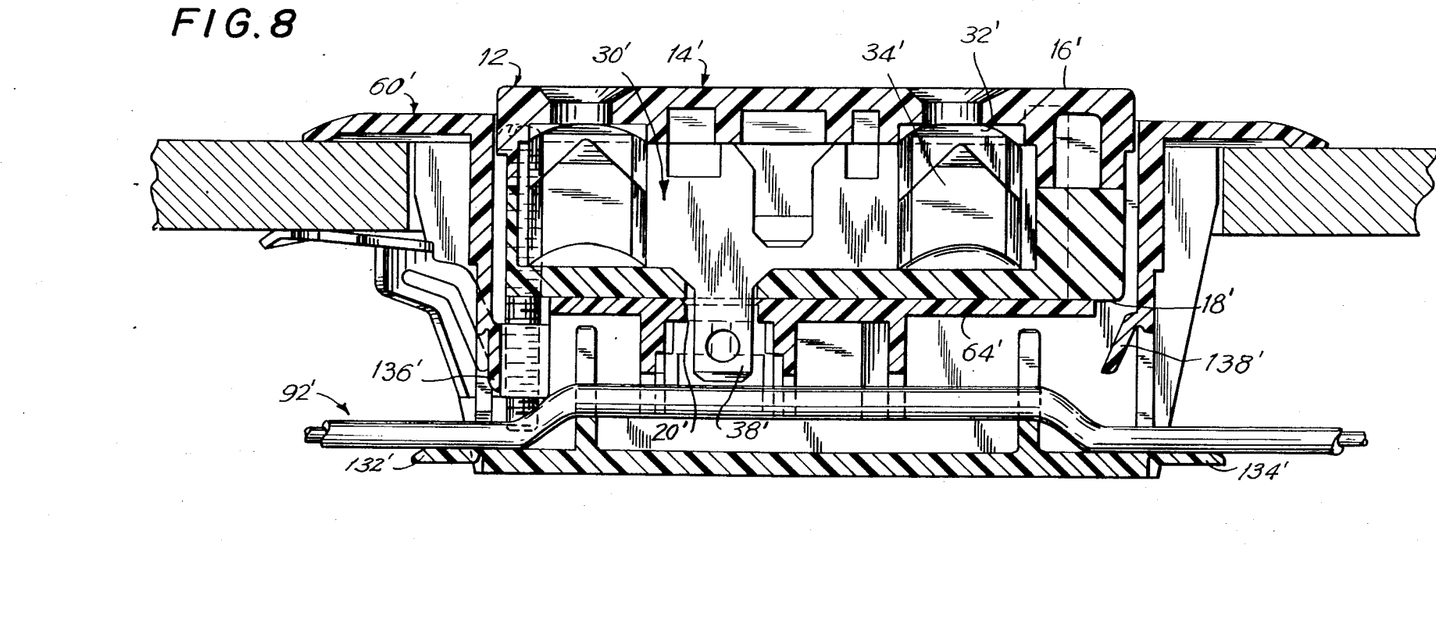
FIG. 8 is an enlarged sectional view as taken along line 8—8 of FIG. 7.

Referring now to the drawings, reference numeral 10 in FIGS. 1-6 generally identifies a wall switch of the rocker type, and reference numeral 12 in FIGS. 7 and 8 generally identifies a duplex electrical receptacle. Both the wall switch 10 and the receptacle 12 are representative of a wide variety of electrical devices, each of which may be mounted in a wiring installation in accordance with this invention.

Returning to representative electrical device 10 in FIGS. 1-6, the device includes a generally parallelepiped housing 14 of electrically-insulating material. The housing 14 includes a front wall 16, a rear wall 18 spaced below the front wall 16 and having openings (e.g. 20 in FIG. 6) extending through the rear wall, and side walls 22, 24 and end walls 26, 28 extending between the front and rear walls, all of the walls bounding an interior compartment 30. Electrical device contacts of electrically-conductive material have interior contact portions 32, 34 (see FIG. 6) located within the compartment 30, and exterior blade portions 36, 38, 40 integral with and extending from the interior contact portions through the openings 20 in the rear wall 18 and past the same. Wall switch 10 also includes a rocker-type armature 42 having two angularly-offset touch portions 42a and 42b, the armature being mounted for rocking movement on the housing 14 between an ON position and an OFF position. The armature 42 has a pair of mounting arms 44, each engaging a leaf spring 46. Contact portion 34 is mounted at the free end of the spring 46. In the illustrated ON position, shown in FIG. 6, in which touch portion 42a lies generally in a horizontal plane parallel to the front wall 16, each spring 46 is permitted to resiliently press contact portion 34 against contact portion 32, thereby making an electrical connection between the blade portion 38 and the spring 46. When the touch portion 42b is manually pressed and lies in a generally horizontal plane parallel to the front wall 16, each mounting arm 44 is operative to deflect its associated spring 46 and to move the respective contact portion 34 out of engagement with contact portion 32, thereby interrupting the electrical connection between the blade portion 38 and the spring 46.

As described in further detail below, the electrical device 10 has a set of four snap-action legs 48, 50, 52, 54 integral with and hingedly connected to the rear wall 18. The legs 48, 50 are located adjacent side wall 22 and are resiliently movable toward the same. The legs 52, 54 are located adjacent the opposite side wall 24 and are resiliently movable toward the same. Each leg has an engaging or gripping portion 56 constituted by a series of parallel score lines, and a tool-engaging free end 58 as described below.

The electrical device 10 is insertable in the direction of arrow A into a support member 60. The support member 60 includes a support body 62 of electrically-insulating material, and having a generally planar support wall 64 having a front surface 64a facing the rear wall 18 of the inserted device 10, a rear surface 64b facing away from the rear wall 19, and apertures 66, 68, 70 extending through the front and rear surfaces of the support wall 64.

First body walls, including side walls 72a, 74a, and end walls 76a, 78a, extend generally perpendicularly of the front surface 64a of the support wall 64, and terminate in a generally rectangular open end 80. These first body walls and the support wall 64 bound a pocket 82 of complementary contour to that of the parallelepiped housing 14 which is inserted into the pocket 82 to assume a mounted position therein.

The support body 62 also includes a generally rectangular face plate 84 integral with the first body walls, and framing the open end 80 of the latter. The face plate 84 lies in a generally horizontal plane parallel to and spaced from the support wall 64. The face plate 84, as well as all the other parts of the support body 62, are constituted of a synthetic plastic material, and the face plate is molded under compression to provide its outer surface with a smooth, finished, attractive appearance.

The support body 62 further includes second body walls, including side walls 72b, 74b and end walls 76b, 78b, extending generally perpendicularly of the rear surface 64b of the support wall 64, and terminating in an open end 86. A cover 88 is mounted over the open end 86 of the second body walls, and bounds therewith a wiring chamber 90 in which an electrical current-carrying cable, e.g. romex cable 92, is received. The cover 88 includes a generally planar base wall 94, a first pair of generally triangular spaced-apart wire guides 96a, 96b projecting upwardly from the base wall 94 at one end of the cover 88, a second pair of wire guides 98a, 98b analogous to the first pair but located at the opposite end of the cover 88, and a set of four snap-action elongated legs 100, 102, 104, 106 extending generally perpendicularly of the base wall 94, and being resiliently yieldable in a direction transverse to their elongation. Each leg on the cover has a wedge-shaped shoulder 108.

The first and second side walls 72a, 72b both lie in the same vertical plane, and the first and second side walls 74a, 74b likewise both lie in another vertical plane which is parallel to the first-mentioned plane. Two guide channels, each identified by reference numeral 110, are formed along the side walls 72a, 72b, one guide channel being adapted to receive leg 100 and the other guide channel being adapted to receive leg 102. Another two guide channels, one for each leg 104, 106, are formed along the side walls 74a, 74b. Each guide channel 110 is wide enough to receive its associated leg of the cover, and each guide channel 110 terminates in a recess 112 which communicates with the pocket 82. When the cover is initially moved in the direction of arrow B in FIG. 1, each shoulder 108 initially enters the guide channel for its associated leg, and each shoulder 108 is deflected outwardly. During this initial movement, each leg of the cover is guided along its associated guide channel. When each shoulder 108 is moved to an overlying position relative to its associated recess 112, the respective shoulder enters into and engages the recess with a snap-type action due to the inherent resiliency of the leg. Thus, the cover is reliably guided onto and snap-mounted on the body side walls. To remove the cover, no special prying tools are necessary, it being merely required to move the shoulders 108 out of their respective recesses 112, and to pull the cover 88 back down out of the guide channels 110 in the direction opposite to arrow B. Nor are special tools necessary to mount the cover.

Figure 1:
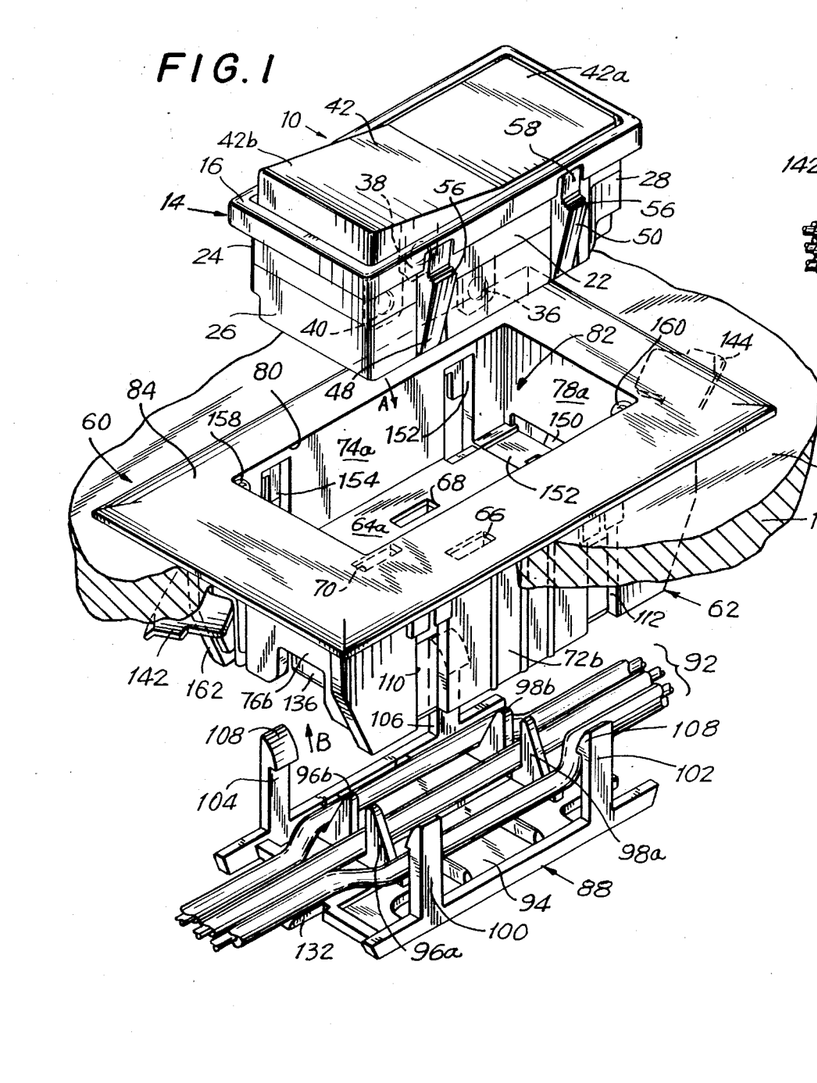
FIG. 1 is an exploded perspective view of one embodiment of a wiring installation, including a wall switch shown prior to assembly and mounted on a partially broken-away wall, in accordance with this invention.

As shown in FIG. 1, the romex cable 92 has three wires 92a, 92b, 92c, each having an outer insulation or jacket, a paper filler, and an inner conductor. Wire 92a is a so-called ground wire, and is routed through the spaces between the wire guide pairs 96a, 96b and 98a, 98b. Wire 92b is a so-called black wire, which is routed outwardly of the wire guides 96b, 98b. Wire 92c is a so-called white wire, which is routed outwardly of the wire guides 96a, 98a. No stripping of the insulation or paper filler, nor any severing of the wires are necessary to achieve an electrical interconnection between the electrical device 10 and the cable 92, as explained below.

Figure 4:
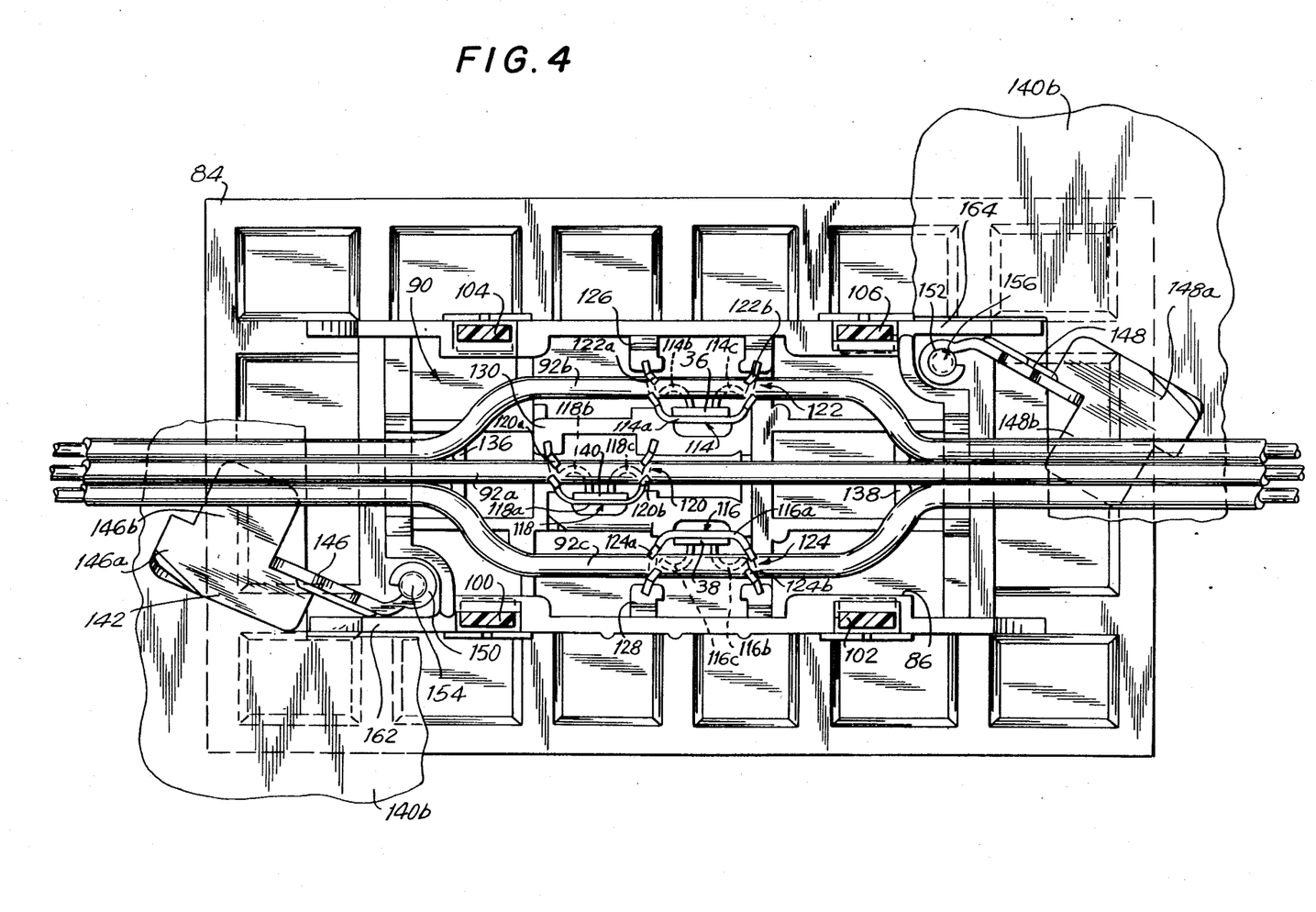
FIG. 4 is an enlarged rear plan view as taken along line 4—4 of FIG. 3.

As best shown in FIG. 4, the support member 60 also includes electrical wire contacts of electrically-conducting material, and located within the wiring chamber 90. The wire contacts have blade wiping portions 114, 116, 118 electromechanically engaging the blade portions 36, 38, 40, respectively, and also have wire-engaging portions 120, 122, 124 electromechanically engaging the conductors 92a, 92b, 92c, respectively. The blade wiping portions 114, 116, 118 have generally planar wipe surfaces 114a, 116a, 118a, respectively, the wipe surfaces engaging in area contact with one planar side of the blade portions 36, 38, 40, respectively. The other planar side of the blade portions 36, 38, 40 are respectively engaged in double-edge contact with the edges of semi-circular curved wipe surfaces 114b, 114c; 116b, 116c; and 118b, 118c; respectively. Each wire-engaging portion 120, 122, 124 comprises two pairs of side piercing penetrators 120a, 120b; 122a, 122b; and 124a, 124b; each pair being spaced longitudinally apart from each other lengthwise along its associated wire. Each pair of penetrators has portions transversely spaced apart from each other by a distance less than the diameter of the inner conductor of the associated wire inserted therein, so that the edge of each penetrator cuts through the surrounding insulation and paper filler and makes piercing contact with the interior respective conductor. Each conductor is so pierced at four locations along its length to ensure a reliable electromechanical connection.

The aforementioned blade portions 36, 38, 40 extend out of the rear of the electrical device 10, and are arranged in a mutual parallelism and in a predetermined pattern. For example, as shown in FIG. 4, blade portions 36, 38 are juxtposed with each other, and blade portion 40 is located between the blade portions 36, 38 off to the left thereof but spaced closer to blade portion 38 than to blade portion 36. This predetermined pattern is identical to the arrangement of the apertures 66, 68, 70 formed in the support wall 64, so that the blade portions 36, 38, 40 can be respectively received in, through and past the apertures 66, 68, 70 and into electromechanical engagement with the blade wiping portions 114, 116, 118 when the electrical device 10 is fully inserted into the pocket 82 to assume the mounted position.

Figures 5, 6:
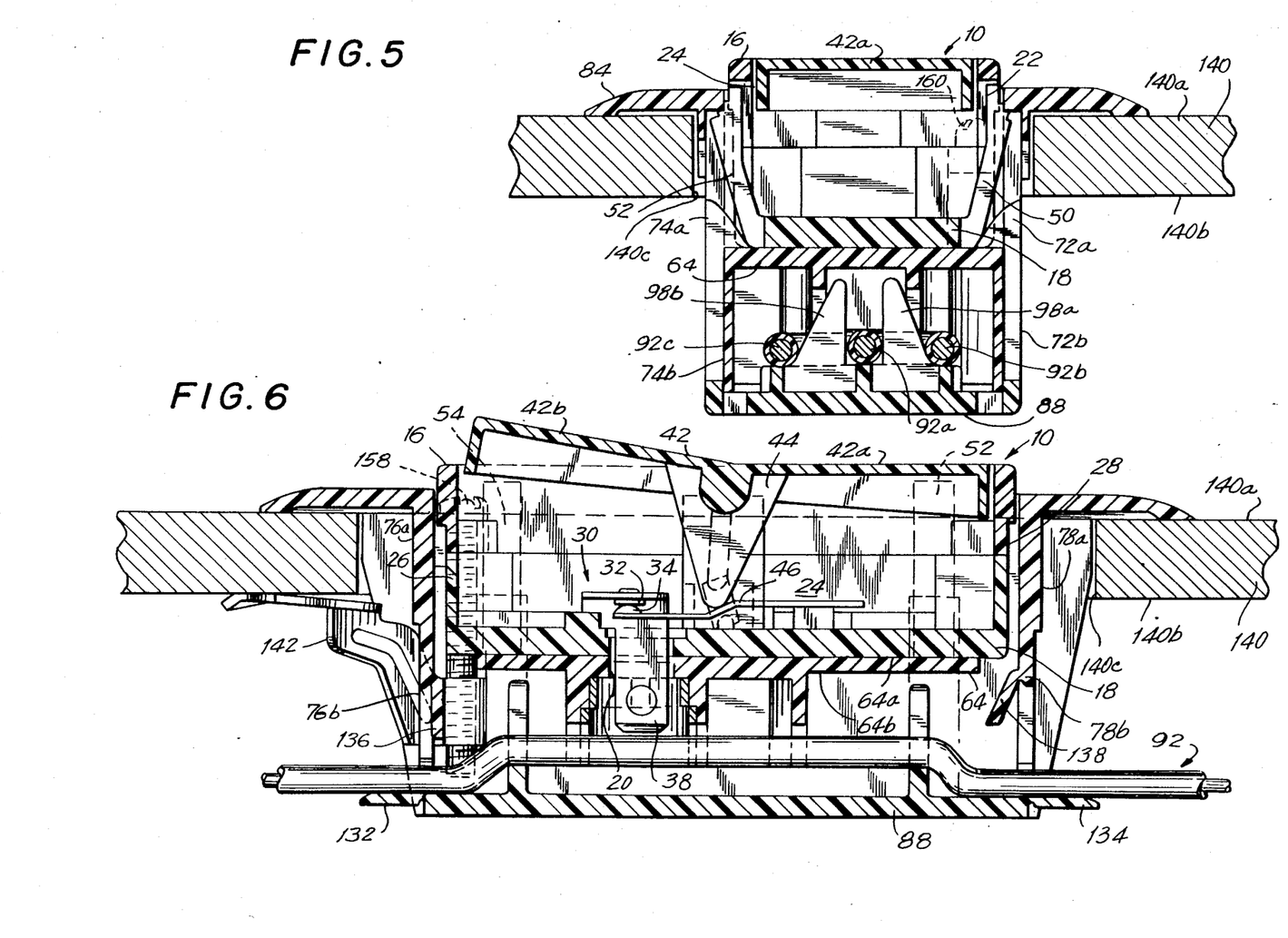
FIG. 5 is an enlarged sectional view as taken along line 5—5 of FIG. 2.
FIG. 6 is an enlarged sectional view as taken along line 6—6 of FIG. 2.

In this mounted position, as best shown in FIGS. 5 and 6, the rear wall 18 of the electrical device 10 rests on and engages the front surface 64a of the support wall 64. The blade wiping portions are integral with the wire-engaging portions, so that once the electrical device 10 is inserted to its mounted position, a reliable, low-loss electrical connection is made between the electrical device 10 and the conductors of cable 92. Support mountings 126, 128, 130 are provided on opposite sides of the electrical wire contacts within the wiring chamber 90 to securely anchor the wire contacts in place.

Figure 3:
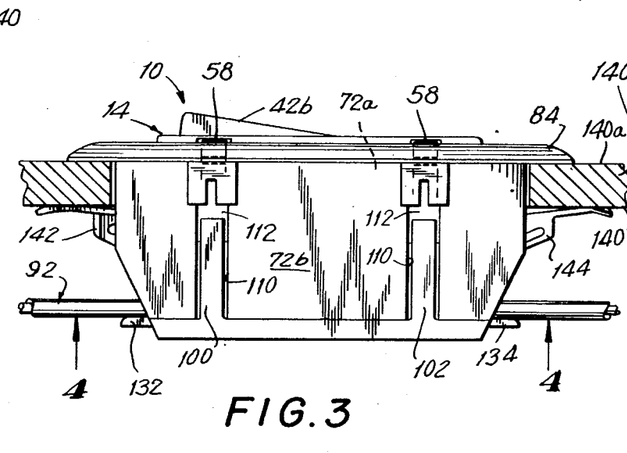
FIG. 3 is a side view of the wiring installation of FIG. 2.

A pair of bend-away planar tabs 132, 134 are hingedly connected to the cover along reduced-thickness hinges. Each tab 132, 134 is initially molded in and assumes an upright state in which it extends generally perpendicularly to the base wall 94 of the cover 88. In response to manual pressure by the installer, each tab 132, 134 may be bent either inwardly into the wiring compartment 90, or outwardly as shown in FIG. 3, for example, to lie in a plane generally coplanar with the base wall 94 of the cover, thus enabling the cable to be readily inserted into the interior of the wiring compartment.

Similarly, another pair of bend-away planar tabs 136, 138 are hingedly connected to the support body 62 along reduced-thickness hinges. Each tab 136, 138 is initially molded in and assumes an upright state in which it extends generally perpendicularly to the support wall 64 of the support body. In response to inward manual pressure, each tab 136, 138 is bent inwardly into the wiring compartment 90 to enable additional cables to be readily inserted into the interior of the wiring compartment.

The tabs 132, 134, 136, 138 are easily bent out of their initial positions and, as noted previously, this eliminates the prior art requirement to break off or remove plastic barriers to gain access to the wiring compartment 90.

Figure 2:
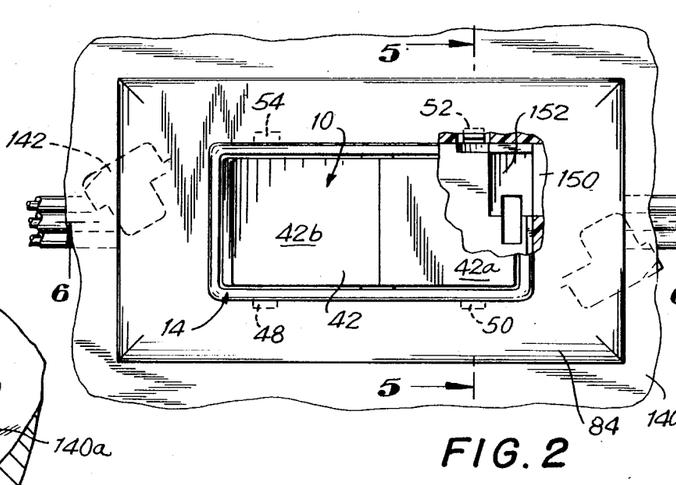
FIG. 2 is a partially broken-away top plan view of the wiring installation of FIG. 1 in an assembled condition.

The wiring installation further comprises clamping means on the support member 60 for fixedly mounting the same behind and on a wall 140 having a forwardly-facing front face 140a and a rearwardly-facing rear face 140b. A mounting hole 140c is formed in the wall between its faces. The clamping means includes a pair of swing-out wall clamps 142, 144 having arm portions 146, 148, respectively, and tubular portions 150, 152, respectively, as well as a pair of drive elements or screws having threaded shafts 154, 156 and screw heads 158, 160, respectively. Each threaded shaft extends along and is turnable about an axis extending generally perpendicularly to the support wall 64. The screws are supported for turning movement by collar mounts provided within the pocket 82. The screw heads 158, 160 are located at opposite corners of the pocket 82 (see FIG. 1), and are located underneath and are concealed by the front wall 16 of the electrical device 10 in the mounted position of the latter. Thus, as shown in FIG. 2, the screw heads 158, 160 are not visible, and this feature contributes to the overall esthetic appearance of the installation.

Each threaded shaft 154, 156 is snugly received in the tubular portions 150, 152, so that when a respective shaft is turned by driving the associated screw head with a screwdriver, the respective tubular portion participates in this turning movement about the turning axis. This joint turning movement is halted when the respective arm portions 146, 148 engage abutments 162, 164 provided at opposite ends of the support body 62. Once the arm portions engage the abutments 162, 164, further turning of the threaded shafts 154, 156 causes the latter to enter more deeply into the tubular portions 150, 152, thereby drawing the wall clamps in an axial direction toward the screw heads.

The arm portions 146, 148 have first generally rectangular clamping areas 146a, 148a, respectively, and second generally rectangular clamping areas or extensions 146b, 148b. Clamping areas 146a, 146b together define a broad, generally planar clamping surface, and clamping areas 148a, 148b also define another broad, generally planar clamping surface.

In use, the support body 62 is first mounted in the hole 140c on the wall 140, so that the face plate 84 overlies and engages the front face 140b of the wall. Thereupon, the screws are turned to jointly move the arm portions against the abutments 162, 164. Then, further turning of the screws causes the clamping surfaces to be drawn into clamping engagement with the rear face 140b of the wall 140. The two clamping surfaces of the wall clamps 142, 144 provide for a very secure anchorage for the support member 60 on the wall.

A pair of cutouts (e.g. 150 in FIGS. 1 and 2) are formed through the end walls 76a, 78a immediately above the support wall 64, and openly communicate with the pocket 82. The cutouts 150 are located in the two opposite corners of the pocket 82 which are not occupied by the wall-clamping screws. Adjacent each cutout 150 are formed a pair of shallow cavities (e.g. 152 in FIGS. 1 and 2) in the support wall 64. Each shallow cavity 152 has a complementary contour to the respective extension 146b, 148b, so that at least a portion of the latter can be accommodated therein in a so-called initial storage position in which the wall clamps are initially positioned. By permitting a portion of the wall clamps to be initially stored within the pocket 82, the clamping surface on each wall clamp is much larger than in the prior art where the wall clamps were always provided exteriorly of the support member. The extensions 146b, 148b not only increase the overall clamping area, but also permit the wall clamps to clamp the wall at a more central location relative to the support body to achieve a very stable mounting.

The aforementioned cutouts 150 serve not only as a passage through which the extensions 146b, 148b pass in the initial storage position, but also serve as convenient viewports through which the installer may observe any obstructions located in the immediate vicinity of the wall clamps prior to deploying the same. Such obstructions might interfere with the proper deployment of the wall clamps. Once the support member 60 is positioned on the wall 140, it would be very inconvenient to have to remove the same should an obstruction prevent the wall clamps from swinging out properly. Hence, by looking through the cutouts, the installer can very readily spot any such obstructions in advance. In addition, the cutouts 150 serve as convenient tool-receiving slots through which a tool may be inserted to remove or push aside any such obstructions without having to remove the support member 60 from its position on the wall.

The wiring installation yet further includes snap-action co-acting means on the device 10 and the support body 62 for snappingly engaging and retaining the electrical device 10 in the mounted position. The aforementioned snap-action legs 48, 50, 52, 54 serve as the means on the device 10 which resiliently yield and are displaced toward the side walls 22, 24 of the device during the insertion of the latter into the pocket 82. The aforementioned engaging portions 56 on the legs 48, 50, 52, 54 snappingly engage and partially enter into cooperating recesses (e.g., see recesses 152, 154 in FIG. 1) formed in the first body side walls 72a, 74a.

The aforementioned tool-engaging end portions 58 on the legs are easily accessible when the electrical device is in its mounted position so that, upon pushing all of the tool-engaging end portions 58 inwardly, the electrical device can be easily removed from the pocket 82 in the direction opposite to the arrow A.

Hence, in accordance with the above features, the wiring installation may be rapidly and efficiently installed on and in the wall 140 without using a conventional metallic junction box. The home owner may replace a defective electrical device 10 without the need for any special tools or the need to call an electrician. Since the electrical device contacts (e.g. contact portions 32, 34 in FIG. 6) within the interior compartment 30 of the housing 14 of the electrical device 10 are physically isolated from the cable 92 located within the wiring chamber 90 of the support body 62, the home owner may replace a defective electrical device 10 without being exposed to or touching the electrically-alive wires 92a, 92b, 92c of the cable 92, and without turning off the power. The physical isolation between the interior compartment 30 of the electrical device 10 and the wiring chamber 90 of the support body 62 eliminates the prior art requirement to strip the outer insulation and remove all the paper filler of a romex cable routed to the wiring installation, thereby eliminating the aforementioned potential safety hazard with regard to igniting the paper filler.

Turning to FIGS. 7 and 8, as mentioned previously, the electrical device may also be a duplex receptacle 12.

The receptacle 12, like the wall switch 10, includes a housing 14' of electrically-insulating material. The housing has a front wall 16' to which access is available from the exterior of the housing, a rear wall 18' spaced from the front wall 16' and having openings (e.g. openings 20' in FIG. 8) extending through rear wall 18', and side walls 22', 24' and end walls 26', 28' extending between the front 16' and rear 18' walls, all of the walls bounding an interior compartment 30'. Electrical device contacts of electrically-conducting material have interior contact portions (e.g. 32', 34' in FIG. 8) located within the interior compartment 30', and exterior blade portions (e.g. 36', 38', 40' in FIG. 7) integral with and extending from the interior contact portions 32', 34' through the openings 20' in the rear wall 18' and past the rear wall. Rather than a rocker-type armature 42, the duplex receptacle has a pair of outlets 42', 44', each comprised of three prong-receiving openings for receiving the prongs of an electrical plug.

In addition, as for the wall switch 10, the housing of the receptacle 12 includes four snap-action legs 48', 50', 52', 54' at the exterior of the housing for snappingly engaging and retaining the receptacle on and within a support member 60'. Additional details of the duplex electrical receptacle 12 can be had by reference to U.S. patent application Ser. No. 685,392, filed Dec. 24, 1984, now U.S. Pat. No. 4,607,906, and owned by the same assignee as the instant application. The entire contents of said patent are hereby incorporated by reference and made a part of the instant application.

The support member 60' may be identical to the support member 60 described above. However, in order to prevent an installer from mistakenly inserting the electrical receptacle 12 within a support member which is intended to receive a wall switch, it is advantageous if the exterior blade portions 36', 38', 40' are arranged in a different pattern from that of the aforementioned predetermined pattern of the blade portions 36, 38, 40 of the wall switch. Of course, this means that the support member 60' in FIG. 8 will be identical to the support member 60, except for the fact that the apertures extending through support wall 64' are arranged in said same different pattern to permit insertion of the exterior blade portions 36', 38', 40' therethrough. For example, as best shown in FIG. 7, the exterior blade portions 36' and 38' are juxtaposed with each other, and the exterior blade portion 40' is located between and to the left of the blade portions 36', 38', but the blade portion 40' is located slightly closer to the blade portion 38' than to the blade portion 36'.

As previously noted, the support member may be molded of a synthetic plastic material, and the electrical device housing and the cover may likewise be made of the same material. The electrically-conducting material for the electrical device contacts and the electrical wire contacts may advantageously be made of a copper-bronze alloy or the like. The wall clamps preferably are constituted of any metallic material such as iron.

Any electrical device may be installed in the wiring installation of this invention, and it is to be expressly understood that devices other than duplex receptacles and wall switches may be employed and are within the spirit of this invention.

Another advantageous feature of this invention resides in the inwardly-directed forces exerted by the snap-action legs 100, 102, 104, 106 of the cover 88 on the support member. Should the cover 88 warp, the forces exerted by the legs tend to increase, thereby making for a more secure assembly.

It will be understood that each of the elements described above, or two or more together, also may find a useful application in other types of constructions differing from the types described above.

While the invention has been illustrated and described as embodied in a wall-mountable wiring installation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A wall-mountable wiring installation, comprising:
   (I) a discrete electrical device including
      (A) a housing of electrically-insulating material and having
         (i) a front wall to which direct manual or electrical access is available from the exterior of the housing,
         (ii) a rear wall spaced from the front wall and having openings extending through the rear wall, and
         (iii) side walls extending between the front and rear walls and bounding therewith an interior compartment, and
      (B) electrical device contacts of electrically-conducting material and having
         (i) interior contact portions located within the compartment, and
         (ii) exterior blade portions integral with and extending from the interior contact portions through the openings in the rear wall and past the rear wall;
   (II) a discrete support member including
      (A) a recessed support body of electrically-insulating material and having
         (i) a generally planar support wall having, as considered in an intended position of use, a forwardly-facing front surface, a rearwardly-facing rear surface, and apertures extending through the front and rear surfaces,
         (ii) first body walls extending generally perpendicularly and forwardly of the front surface of the support wall and terminating in an open end, said first body walls and the support wall bounding a pocket in which the electrical device is removably mounted and insertable from a removed position in which the electrical device is remote from the pocket, to a mounted position in which the blade portions extend through the apertures of the support wall and past the same,
         (iii) a face plate integral with the first body walls at the open end of the latter and lying in a plane generally parallel to and spaced from the support wall,
         (iv) second body walls extending generally perpendicularly and rearwardly of the rear surface of the support wall and terminating in an open end, and
         (v) a cover mountable over the open end of the second body walls and bounding therewith a wiring chamber in which an electrical current-carrying cable is received remote from said interior compartment of the housing, and
      (B) electrical wire contacts of electrically-conducting material and located within the wiring chamber and having
         (i) blade-wiping portions electromechanically engageable with the blade portions in the mounted position, and
         (ii) wire-engaging portions integral with the blade-wiping portions and electromechanically engageable with the cable received in the wiring chamber;
   (III) clamping means on the support member for fixedly mounting the same behind and on a wall having a forwardly-facing front face and a rearwardly-facing rear face, said clamping means including
      (A) at least one wall clamp having a clamping surface movable toward the face plate, and
      (B) at least one drive element operative to move the clamping surface into clamping engagement with the rear face of the wall when the face plate is in overlying engagement with the front face of the wall; and
   (IV) snap-action co-acting means on the side walls of the housing and on the first body walls of the support body for snapplingly cooperatively engaging and normally lockingly retaining the electrical device within the recessed support body in the mounted position, and for cooperatively disengaging the electrical device from the recessed support body to the removed position, whereby installation and replacement of the electrical device in the wall-mounted support member is easily, rapidly and safely effected without direct access to the current-carrying cable.

2. The wiring installation as recited in claim 1, wherein the electrical device is a duplex electrical receptacle having a pair of adjacent sockets into each of which an electrical plug having prongs is insertable to conduct electrical current from the cable through the electrical wire contacts and the electrical device contacts to the plug.

3. The wiring installation as recited in claim 1, wherein the electrical device is an electrical switch having a manually-movable armature at the front wall of the housing and operative, when the armature is moved, to switch electrical current from the cable through the electrical device contacts of the switch.

4. The wiring installation as recited in claim 1, wherein the housing has a generally parallelepiped shape, and wherein the pocket has a complementary contour for snug reception of the housing.

5. The wiring installation as recited in claim 1, wherein the exterior blade portions of the electrical device and the apertures of the support wall are arranged in the same predetermined pattern; and further comprising another electrical device having exterior blade portions arranged in a different pattern to prevent insertion of said other electrical device into the apertures of the support wall of the wallmounted support member.

6. The wiring installation as recited in claim 1; and further comprising means on the cover and the support body for snappingly engaging the cover on the support body, said cover including a generally planar base wall and a plurality of elongated legs extending generally perpendicularly to the base wall and being resiliently yieldable in a direction transverse to their elongation, said legs terminating in shoulders, and said support body having a plurality of recesses into each of which a respective shoulder is received with snap-type inward engagement upon mounting of the cover.

7. The wiring installation as recited in claim 1, wherein the one drive element has an elongated drive shaft extending along and turnable about an axis, and has a drive head located wiithin the pocket.

8. The wiring installation as recited in claim 7, wherein the drive head is located underneath and is concealed by the front wall of the electrical device in the mounted position of the latter.

9. The wiring installation as recited in claim 7, wherein the wall clamp includes a tubular portion in which the drive shaft is received, and an arm portion integral with the tubular portion and extending transversely of the axis, said clamping surface being provided on said arm portion.

10. The wiring installation as recited in claim 9, wherein the support member has an abutment, and wherein the one drive element is initially operative to turn the arm portion from an initial storage position about the axis into engagement with the abutment, and thereupon to draw the clamping surface of the arm portion in an axial direction into engagement with the rear face of the wall.

11. The wiring installation as recited in claim 10, wherein the first body walls have at least one cutout in open communication with the pocket, and wherein the arm portion extends, at least in part, through the cutout into the pocket in the storage position.

12. The wiring installation as recited in claim 11, wherein the support wall has at least one shallow cavity in which at least a portion of the arm portion is accommodated in the storage position.

13. The wiring installation as recited in claim 1, wherein the snap-action co-acting means includes a plurality of legs adjacent the side walls of the housing and resiliently yieldable toward the respectively adjacent side wall during the insertion of the housing into the pocket, each leg having an engaging portion, and wherein the first body walls have recesses into each of which a respective engaging portion is received with snap-type engagement in the mounted position.

14. The wiring installation as recited in claim 13, wherein each leg has a tool-engaging free end extending beyond the face plate in the mounted position, each free end being accessible to a demounting tool.

15. The wiring installation as recited in claim 1; and further comprising bend-away tabs hingedly connected to the cover and to the second body walls, each tab being yieldable in response to pressure to form an open channel between the wiring chamber and the exterior of the support member.

16. The wiring installation as recited in claim 15, wherein the tabs on the second body walls yield inwardly into the wiring chamber and are located out of the path of movement of the clamping surface of the wall clamp.

17. The wiring installation as recited in claim 1, wherein the first body walls have at least one cutout in open communication with the pocket, and wherein the cutout is located on the support member adjacent the wall clamp and serves as a port through which the wall clamp is visible and accessible.

* * * * *